United States Patent
Bordeaux et al.

(10) Patent No.: US 10,304,258 B2
(45) Date of Patent: May 28, 2019

(54) HUMAN FEEDBACK IN 3D MODEL FITTING

(71) Applicant: Microsoft Technology Licensing, LLC, Redmond, WA (US)

(72) Inventors: Lucas Bordeaux, Cambridge (GB); Thomas Joseph Cashman, Cambridge (GB); Federica Bogo, Cambridge (GB); Jamie Daniel Joseph Shotton, Cambridge (GB); Andrew William Fitzgibbon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/658,380

(22) Filed: Jul. 24, 2017

(65) Prior Publication Data
US 2019/0026952 A1 Jan. 24, 2019

(51) Int. Cl.
  *G06T 19/20* (2011.01)
  *G06N 99/00* (2019.01)
  *G06N 20/00* (2019.01)

(52) U.S. Cl.
  CPC .............. *G06T 19/20* (2013.01); *G06N 20/00* (2019.01); *G06N 99/005* (2013.01); *G06T 2219/004* (2013.01)

(58) Field of Classification Search
  CPC .................. G06K 9/00201; G06T 2207/30196
  USPC ........................................................ 345/419
  See application file for complete search history.

(56) References Cited

U.S. PATENT DOCUMENTS

| | | | |
|---|---|---|---|
| 6,959,109 B2 | 10/2005 | Moustafa | |
| 8,037,043 B2 | 10/2011 | Zoeter et al. | |
| 8,351,646 B2 | 1/2013 | Fujimura et al. | |
| 2011/0267344 A1* | 11/2011 | Germann | G06K 9/00201 345/420 |
| 2015/0185717 A1 | 7/2015 | Sayyar-rodsari et al. | |
| 2016/0203361 A1 | 7/2016 | Black et al. | |

OTHER PUBLICATIONS

Tang, et al., "Context-aware Natural Language Generation with Recurrent Neural Networks", https://northanapon.github.io/papers/2016/12/01/context-aware-nlg-mn.html, Published on: Dec. 1, 2016, 2 pages.

Ye, et al., "A Generative Model for Generating Relevance Labels from Human Judgments and Click-Logs", In Proceedings of the 23rd ACM International Conference on Conference on Information and Knowledge Management, Nov. 3, 2014, pp. 1907-1910.

(Continued)

*Primary Examiner* — Thomas J Lett

(57) ABSTRACT

A ground truth engine is described which has a memory holding a plurality of captured images depicting an articulated item. A processor of the engine is configured to access a parameterized, three dimensional (3D) model of the item. An optimizer of the ground truth engine is configured to compute ground truth values of the parameters of the 3D model for individual ones of the captured images, such that the articulated item depicted in the captured image fits the 3D model, the optimizer configured to take into account feedback data from one or more humans, about accuracy of a plurality of the computed values of the parameters.

20 Claims, 7 Drawing Sheets

(56) References Cited

OTHER PUBLICATIONS

Belagiannis, et al., "Recurrent Human Pose Estimation", In Proceedings of the Computing Research Repository, May 2016, 8 pages.

Kulesza, et al., "A Learning Approach to Improving Sentence-Level MT Evaluation", In Proceedings of the 10th International Conference on Theoretical and Methodological Issues in Machine Translation, Oct. 4, 2004, 11 pages.

Collet, et al., "High-Quality Streamable Free-Viewpoint Video", Microsoft Corporation, http://hhoppe.com/fvv.pdf?bcsi_scan_3a9fd5b29d5605d3=1, Published on Sep. 10, 2015, 13 pages.

Nyarko, et al., "Semi-Automatic Genration of Ground Truth Data for Point Cloud Segmentation", hrzz, Ozijek, 2016, http://www.etfos.unios.hr/dokumenti/projects/hrzz-projects/advanced-3d-perception-for-mobile-robot-manipulators/research/ARP3D.D3.2.pdf, 9 pages.

Schöning, et al., "Semi-automatic ground truth annotation in videos", In Proceedings of K-CAP 2015, Oct. 7-10, 2015, 4 pages.

"International Search Report and Written Opinion Issued in PCT Application No. PCT/US2018/034815", dated Aug. 10, 2018, 15 Pages.

Blanz, et al., "A Morphable Model for the Synthesis of 3D Faces", In Proceedings of 26th Annual Conference on Computer Graphics and Interactive Techniques, Jul. 1, 1999, pp. 187-194.

Hertzmann, Aaron, "Interactive 3D Scene Reconstruction from Images", In Technical Report, Apr. 22, 1999, 8 Pages.

Moccozet, et al., "Animatable Human Body Model Reconstruction from 3D Scan Data using Templates", In Proceedings of Workshop on Modelling and Motion Capture Techniques for Virtual Environments, Dec. 9, 2004, pp. 1-7.

Oliveira-Santos, et al., "3D Face Reconstruction from 2D Pictures: First Results of a Web-Based Computer Aided System for Aesthetic Procedures", In Proceedings of Annals of Biomedical Engineering, vol. 41, Issue 5, May 2013, pp. 1-32.

Pighin, et al., "Synthesizing realistic facial expressions from photographs", In Proceedings of the 25th annual conference on Computer graphics and interactive techniques, Jul. 24, 1998, pp. 1-10.

"CrazyTalk 8 Tutorial—Two Image 3D Face Fitting", Retrieved From: https://www.youtube.com/watch?v=G6E-BZfYLrU, Dec. 18, 2015, 3 Pages.

\* cited by examiner

HUMAN FEEDBACK IN 3D MODEL FITTING

BACKGROUND 3D model fitting is a field of engineering in which captured sensor data such as depth images, stereo images, color images and other captured sensor data is observed from a scene depicting one or more objects, and the observed data is fitted to 3D models of the objects. In this way a computer is able to compute a representation of the objects and/or scene which is succinct and yet extremely powerful since it enables the computer to navigate in the scene (robotic control), reason about objects in the scene, overlay virtual objects onto the scene in a way which takes the objects into account, and control user interfaces in dependence on objects in the scene such as human hands and bodies.

As a result of fitting the observed data to the 3D model, values of parameters of the model are computed such as one or more of: orientation, translation, shape and pose. Where the 3D model is articulated the parameters of the model typically include a plurality of joint angles and positions of joints and/or end effectors such as finger tips.

Ground truth data, in the context of 3D model fitting, comprises observed sensor data and corresponding values of the 3D model parameters which are known to be highly accurate. Obtaining such ground truth data is extremely difficult and expensive and is useful for a variety of applications, including evaluation of 3D model fitters, machine learning and applications in the film industry, such as avatar animation, 3D motion capture for green screening and others.

The embodiments described below are not limited to implementations which solve any or all of the disadvantages of known 3D model fitting systems, or known systems for obtaining ground truth data.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A ground truth engine is described which has a memory holding a plurality of captured images depicting an articulated item. A processor of the engine is configured to access a parameterized, three dimensional (3D) model of the item. An optimizer of the ground truth engine is configured to compute ground truth values of the parameters of the 3D model for individual ones of the captured images, such that the articulated item depicted in the captured image fits the 3D model, the optimizer configured to take into account feedback data from one or more humans, about accuracy of a plurality of the computed values of the parameters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Figure 1:
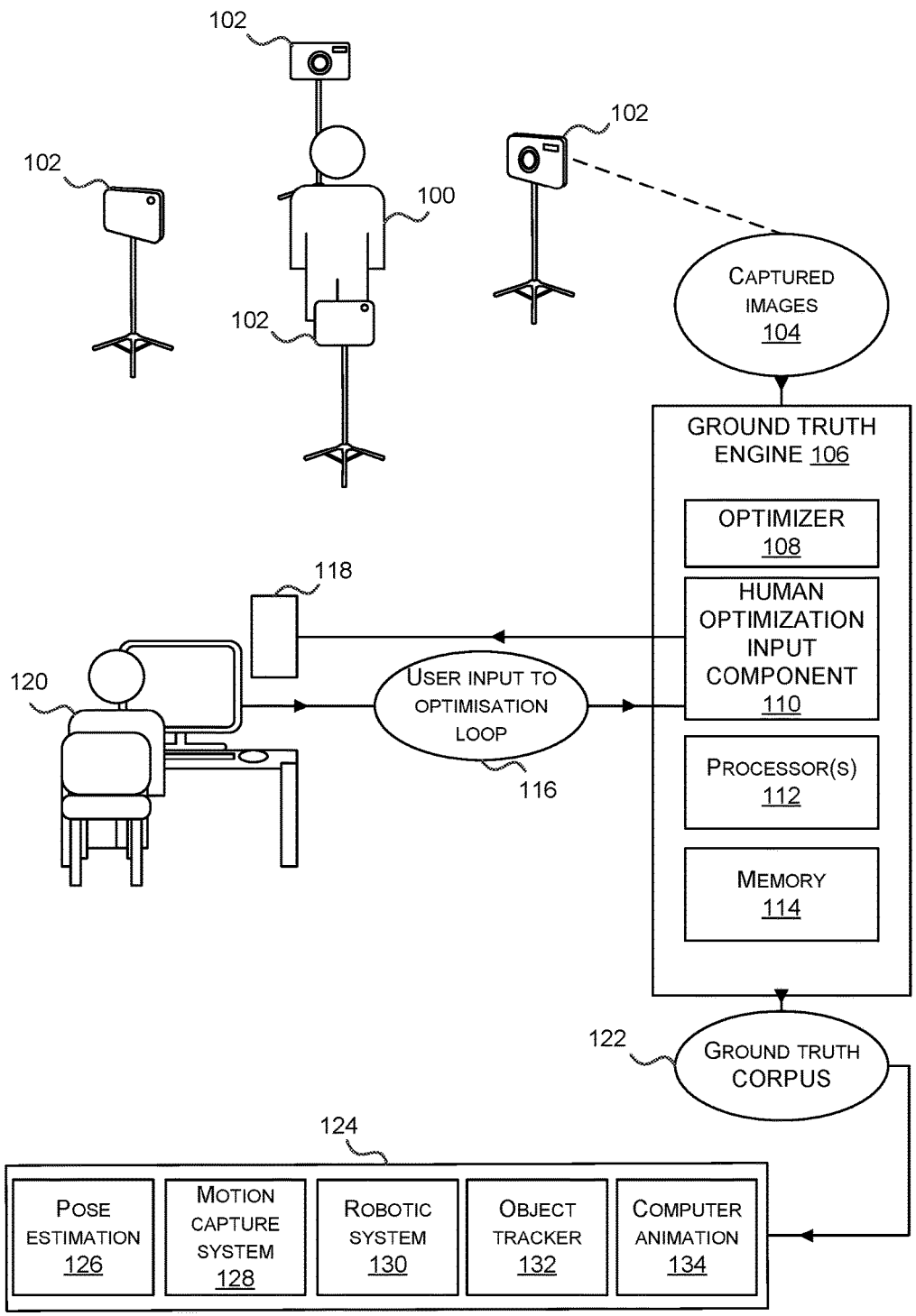
FIG. 1 is a schematic diagram of a plurality of capture devices capturing images of an articulated object, and of a ground truth engine which uses human feedback and computes a corpus of ground truth data used by downstream systems.

FIG. 1 shows a ground truth engine 106 which is computer implemented and which is configured to compute a corpus 122 of ground truth data comprising images of an articulated item and, for individual ones of the images, highly accurate values of parameters of a 3D model of the articulated item fitting the depiction of the item in the image. The ground truth engine 106 receives captured images 104 such as stereo images, depth images from depth cameras, color images or other images depicting the articulated item. The articulated item is a complete articulated object such as a human body, a laptop computer, an animal, or is part of an articulated object, such as a human hand, a human head and shoulders, a human foot.

Since the ground truth engine 106 is to compute a corpus of ground truth data 122 which is highly accurate, the captured images 104 are to be accurate (high signal to noise ratio) and captured from accurately known camera locations. For example, the capture devices 102 have accurately known locations such as by being fixed to the ground or other supporting structures, and comprise accurate sensors such as stereo cameras. Having said this, the examples herein also work with captured images 104 from other types of camera, and where the camera locations are not fixed.

FIG. 1 shows a plurality of capture devices 102 which are fixed to the ground and which are located at different positions around a scene. In this example the scene comprises a person 100 although other scenes can be used such as where there are multiple people, or where the scene comprises other objects and surfaces. In this example four capture devices 102 are shown for clarity although there may be tens of capture devices in practice. The examples described herein are workable for one or more capture devices. By increasing the number of capture devices used the ability to capture images of the scene from a variety of different view points is increased so as to deal with occlusion. The captured images are anonymized to remove sensitive data.

The ground truth engine 106 comprises an optimizer 108, a human optimization input component 110, one or more processors 112 and a memory 114. The memory holds a plurality of the captured images 104 depicting an articulated item such as the person 100. The processor 112 is configured to access a parameterized, three dimensional, 3D, model of the item. A non-exhaustive list of examples of 3D model is: a mesh model, a smooth-surface version of a mesh model, a sub-division surface model, a skinned mesh model. The 3D model is parameterized such as by having parameters which represent orientation, shape and pose of the 3D model. Typically there are six or more parameters and there may be tens of parameters such as thirty or more.

The optimizer 108 is configured to compute ground truth values of the parameters of the 3D model for individual ones of the captured images, such that the articulated item depicted in the captured image fits the 3D model. The ground truth values of the parameters are numerical values and are expressed in vector form in some cases. In some examples, the optimizer fits the observed data to the 3D model by optimizing an energy function expressing how the observed data is expected to fit the 3D model. In some examples, the optimizer fits the observed data to the 3D model by using a render and compare process whereby images are rendered from the 3D model and compared with the observed images. The computation of the optimizer is resource intensive and complex; and often the result computed by the optimizer is a local minimum rather than an accurate global minimum of the problem. To address this human input to the optimization process is used and is found to enable the optimizer 108 to produce highly accurate results.

Human input is obtained and incorporated into the optimization process using the human optimization input component 110. This component selects one or more instances of the posed model computed by the optimizer 108 and presents these to a human 120 as a 3D view using a computing device 118 such as a desk top computer, an augmented reality computing device or any other suitable computing device. Since the view is 3D the human 120 is able to rotate the 3D view of the posed model in order to view it from different view points. The user is able to visually inspect the 3D view and to annotate it with feedback. In an example, a user is able to visually check whether the 3D view of the posed model correctly positions joints and end effectors of the articulated item and to indicate where on the 3D view one or more of these positions should really be. The feedback from the human 120 is provided 116 to an optimization loop of the optimizer 108. The optimizer 108 is configured to take into account feedback data from one or more humans 120, about accuracy of a plurality of the computed values of the parameters.

In some cases the human 120 carries out two types of task which are a verification task and an annotation task. One or both of these tasks generate the feedback data. The verification task comprises viewing a 3D view of a posed model and indicating whether it is accurate or not. The annotation task comprises viewing a 3D view of a posed model and annotating the 3D view with correct locations of one or more joints, end effectors or other parts of the articulated item.

Figure 2A:
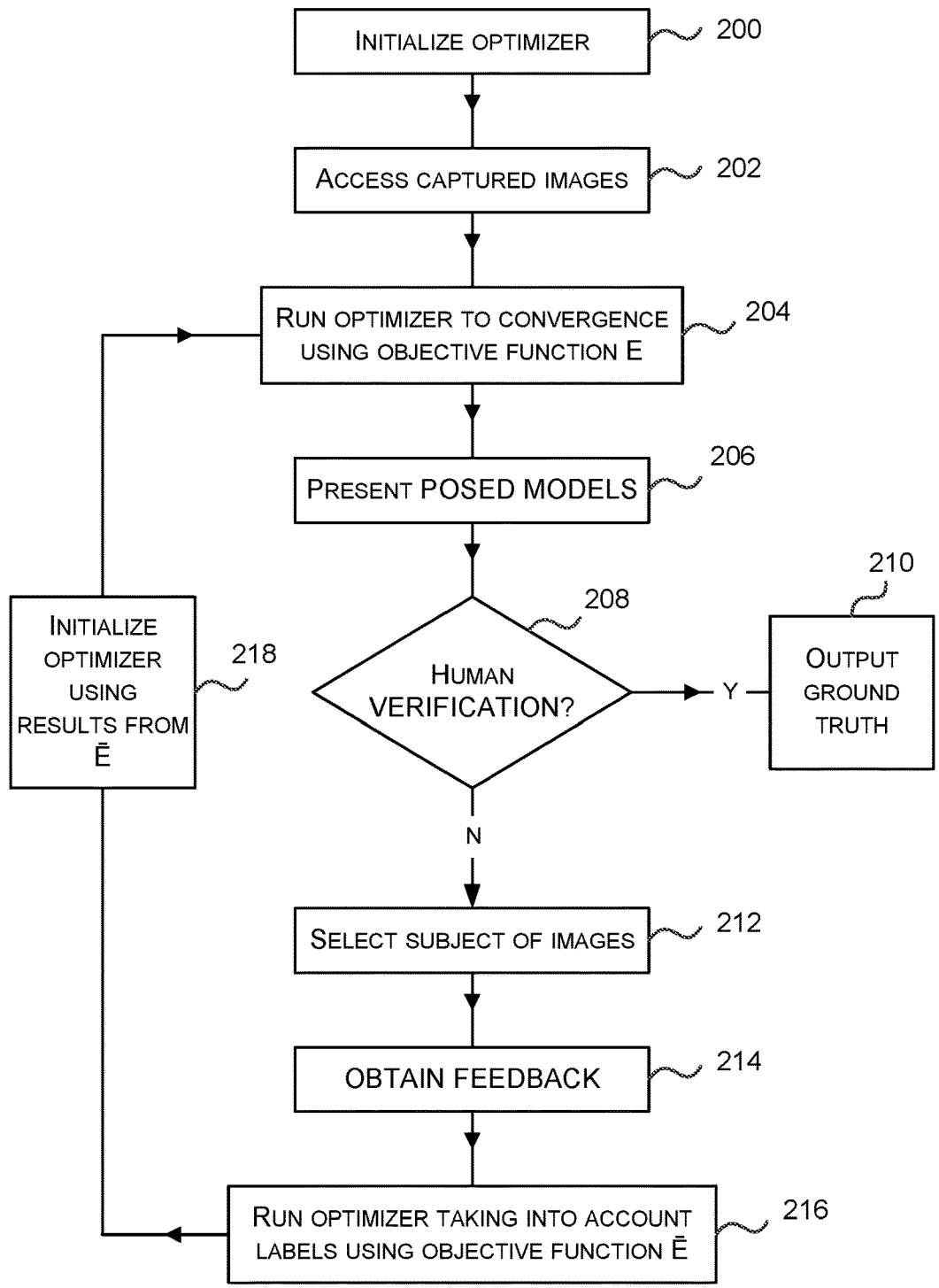
FIG. 2A is a flow diagram of a method of operation at the optimizer and human optimization input component of FIG. 1.
Figure 2B:
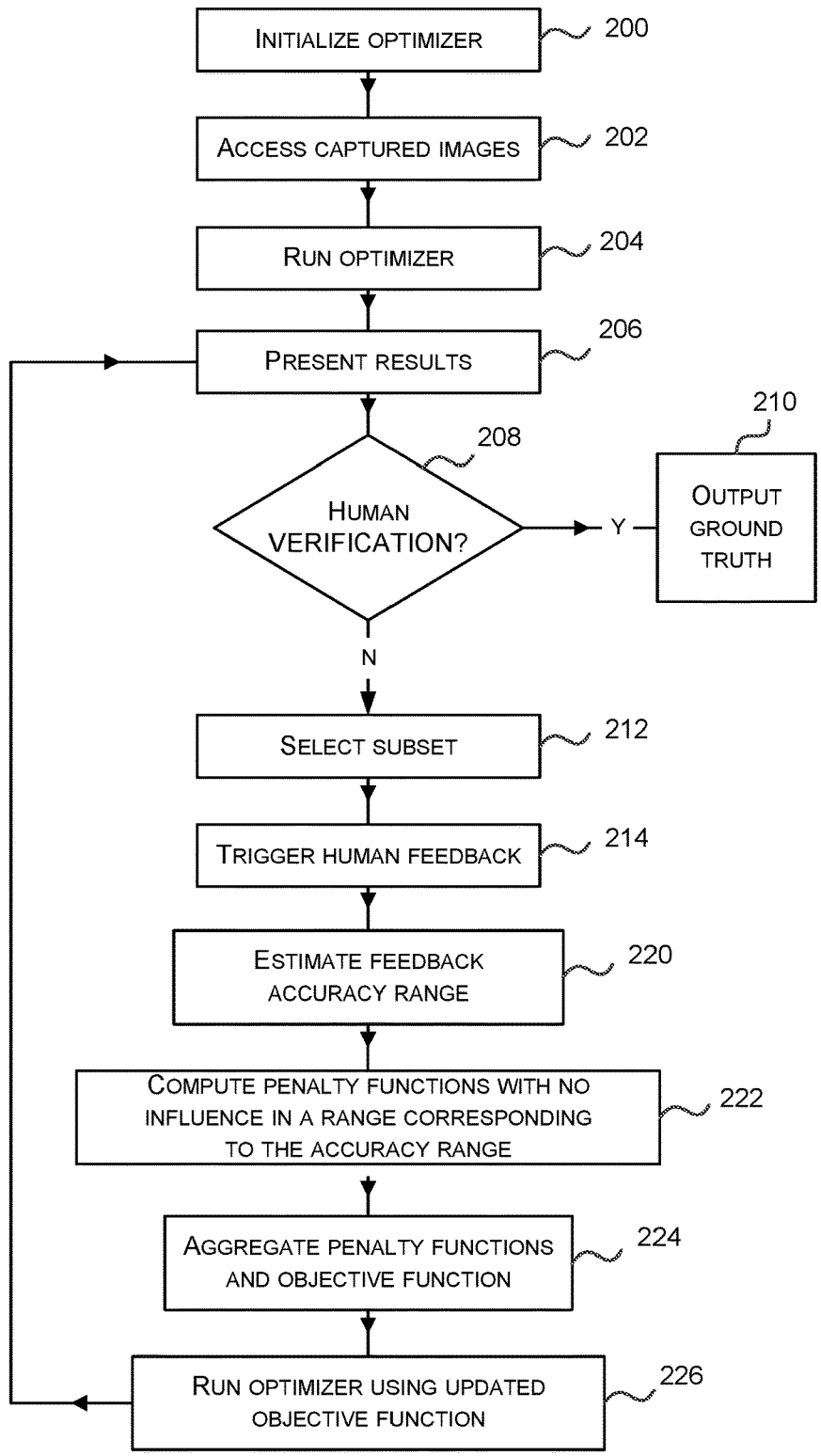
FIG. 2B is a flow diagram of another method of operation at the optimizer and human optimization input component of FIG. 1.

More detail about how the feedback data from these tasks is used by the optimizer 108 is given with respect to FIGS. 2A and 2B.

Once the ground truth corpus 122 has been computed by the ground truth engine 106 it is made available to one or more downstream systems 124. A non-exhaustive list of examples of such downstream system 124 is: pose estimation 126, motion capture system 128, robotic system 130, object tracker 132, computer animation 134. The downstream system 124 is able to use the ground truth corpus 122 for a variety of tasks such as to evaluate the downstream system, for machine learning, for improvement of the downstream system using the results of evaluation.

Alternatively, or in addition, the functionality of the optimizer 108 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

FIG. 2A is a flow diagram of a method at the optimizer and human optimization input component of FIG. 1. The optimizer is initialized 200 with one or more of: human annotation data received from the human optimization input component 110, random initial values of the parameters of the 3D model, values computed from a previous execution of the optimizer. The optimizer 108 accesses the captured images 104 and runs 204 to convergence using an objective function E. The optimizer uses an iterative process and convergence is detected when there is little or no change in the values of the parameters of the 3D model between iterations, or after a specified number of iterations. The objective function E is also known as an energy function and it expresses how the parameterized 3D model is expected to fit the data, such as by expressing a difference between the model and the observed data, or between an image rendered from the model and the observed data.

To achieve high accuracy as compared with real-time model fitters, large amounts of computing resources are used by the optimizer 108, such as from the cloud. For example, the optimization is carried out over a plurality of time instances of the captured images 202 in some cases. Since the optimization may be carried out offline, that is, independently of any frame rate of the capture devices 102, it is possible for the optimization to be over batches of captured images. The optimization may use significant amounts of computational resources such as those available in a cloud computing environment such as a cloud data center. By using large amounts of computational resources the optimizer 108 is able to achieve highly accurate results by considering large sets of candidate poses, repeating many iterative pose adjustment steps, using extra calibration steps to account for item-specific details in shape, and by avoiding many shortcuts which are typically used in real-time model fitting systems such as considering only a subset of the data points in each image.

The results of the model fitting at this point in the process of FIG. 2A comprises a plurality of sets of values of the model parameters, one set per individual time instance of the captured images. The human optimization input component 110 generates and presents 3D views of the 3D model with different ones of the sets of values applied. The human 120 views the presented posed 3D models 206 and carries out human verification 208 by indicating whether the posed 3D model is correct or not. If all or a specified proportion of the posed 3D models are correct the computed values of the model parameters and the associated captured images are output 210 to the ground truth corpus 122. Otherwise the human optimization input component 110 selects a subset of the captured images 212. The corresponding posed 3D model for each of the selected images is presented to the human 120 to obtain feedback 214. The feedback comprises annotations indicating positions of one or more joints or other locations on the articulated item.

The feedback is converted into a form suitable for aggregation with an objective function E of the optimizer. For example, the feedback comprises one or more penalty functions which are formed from the feedback values and which are added to the objective function E to form another objective function denoted by the symbol $\hat{E}$.

The optimizer 108 is then run taking into account the feedback by using the objective function $\hat{E}$. Once convergence is reached the optimizer is initialized using the results obtained by optimizing $\hat{E}$ (see step 218 of FIG. 2A) and the optimizer 108 is run again using the original objective function E which does not take into account the feedback. This relaxes the constraints which were imposed on the objective function by adding the penalty function(s). The operations 204 to 218 are repeated a plurality of times until the human verification 208 is successful and the method ends. In this way, highly accurate ground truth parameter values of the 3D model are obtained for captured images depicting an instance of the articulated item being modeled. The ground truth parameter values are obtained in a systematic, automated manner for a huge number of captured images. In this way ground truth data can be collected for large numbers of instances of the articulated item and large numbers of poses of individual articulated items.

Whilst the method of FIG. 2A is fully workable, in some cases it may use many passes of "human in the loop optimization", as there is no guarantee that the constraints added by the feedback from the human are respected after relaxation. In the method of FIG. 2A there is use of the objective function with the aggregated penalty function followed by relaxation using the original objective function. The method of FIG. 2B is an example where the relaxation process is omitted and highly accurate results are obtained with relatively few passes of "human in the loop optimization" as compared with the process of FIG. 2A. In this case, an accuracy range is empirically determined for one or more types of the human feedback.

The optimizer 108 is initialized in the same way as for the method of FIG. 2A. The optimizer 108 accesses the captured images 104 and executes. The results of the optimization are presented to the human 120 as described above with reference to FIG. 2A and the human 120 verifies whether the results are accurate or not. If the verification is successful the results are output as ground truth data 210. If the verification is unsuccessful the human optimization input component 110 selects a subset of the captured images 104 and triggers a process where human feedback is obtained 214. An estimate of an accuracy range of the feedback is obtained 220 from empirical results, and one or more penalty functions are computed 222 which have no influence on the objective function E in a range corresponding to the accuracy range.

The penalty functions are aggregated 224 with the objective function by addition or in other ways to produce an updated objective function. The updated objective function is then optimized 226 and the process repeats from operation 206 as indicated in FIG. 2B until the verification process is successful.

Figure 3:
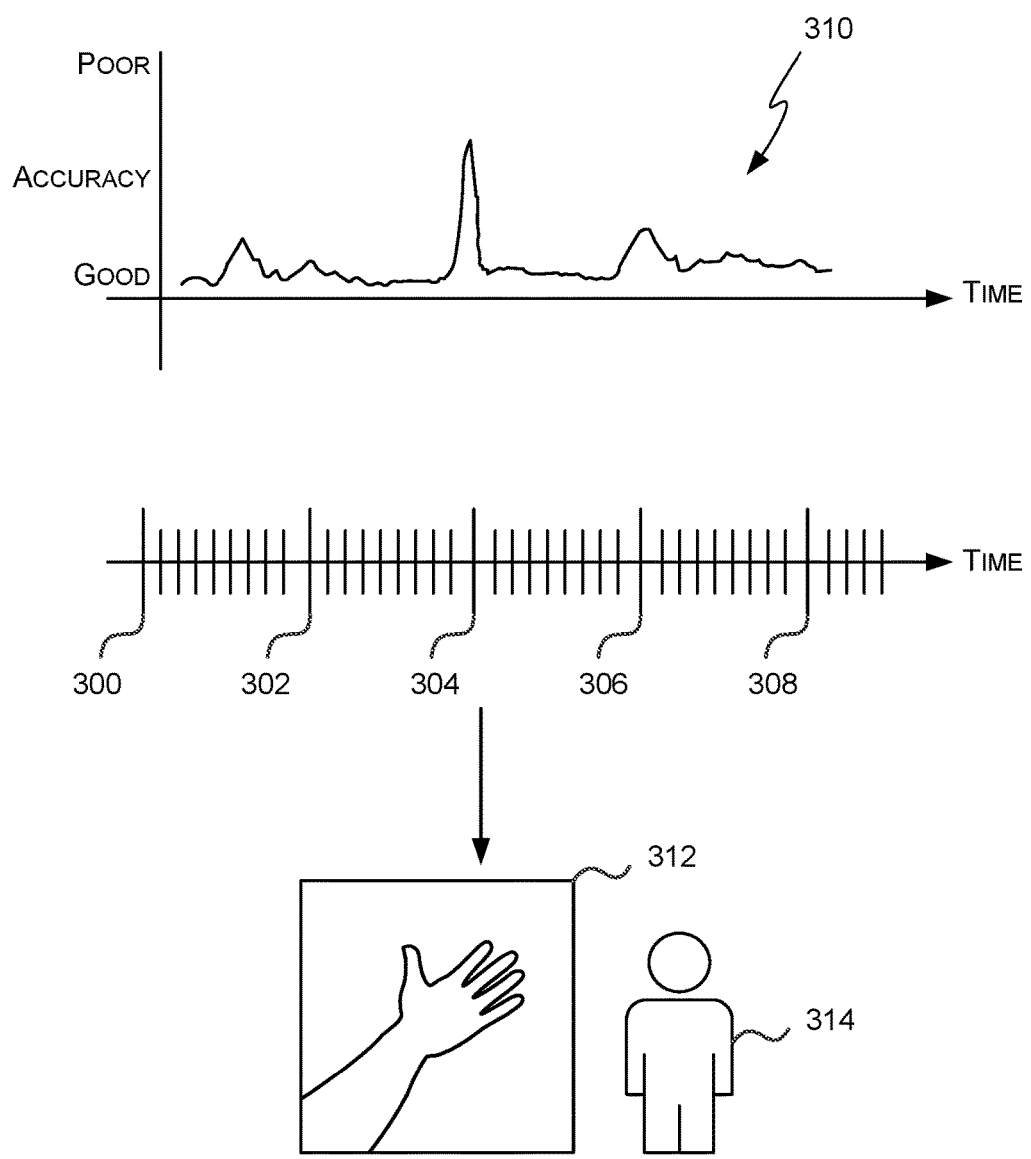
FIG. 3 is a schematic diagram of frames of observed data and variation in accuracy of a 3D model fitter over time, and indicating a visual representation of a 3D posed model being annotated by a human.

FIG. 3 shows a graph 310 of the accuracy of parameter values computed by the optimizer 108 over time, where different captured images are captured at different times, and without the use of the human feedback described herein. This illustrates how the accuracy of the results of the optimizer are highly variable and this demonstrates the need for the addition of the human feedback into the optimization loop as described herein. FIG. 3 also shows a schematic representation of captured images (represented as vertical lines) from capture devices 102 over time and illustrates a subset of these 300, 302, 304, 306, 308 selected for annotation by a human 314. For each of the individual selected captured images 302, 304, 306, 308 the human is able to view at display 312 the 3D posed model which is the 3D model with values of the parameters computed by the optimizer from the associated captured images, applied to it. The human 314 is able to rotate the view at display 312 and is able to annotate the view with positions of one or more joints or other locations of the articulated item.

Figure 4:
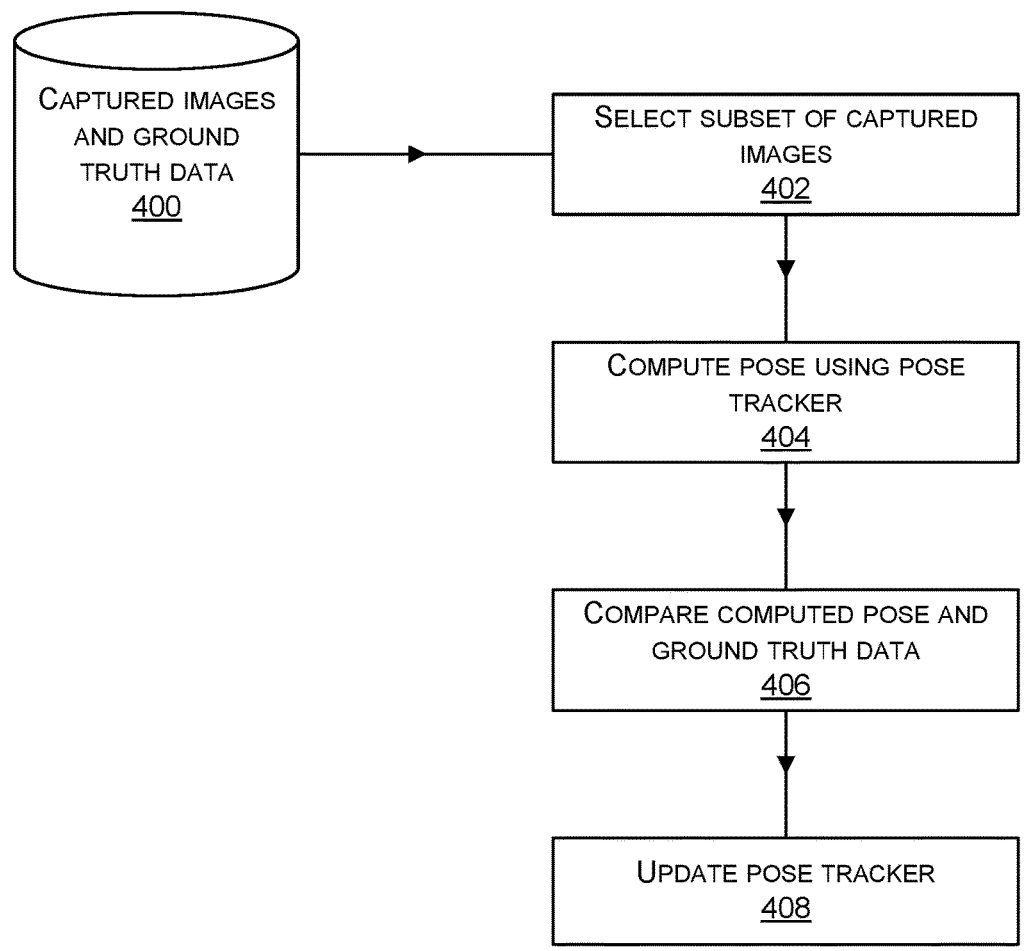
FIG. 4 is a flow diagram of use of ground truth data to evaluate and update a pose tracker.

FIG. 4 is a schematic diagram of a method of using the ground truth corpus 122 for evaluation and update of a pose tracker. The ground truth corpus comprises captured images and associated ground truth values of the parameters of the 3D model. A sub-set of the captured images are selected 402 and used to compute 404 pose of the 3D model with the pose tracker. The computed pose is compared with the ground truth data at comparison operation 406 and in this way the pose tracker is evaluated. The pose tracker is then updated 408 to make it more accurate, if required. The update is done by modifying the algorithms used by the pose tracker and/or by retraining modules of the pose tracker using the ground truth data.

Figure 5:
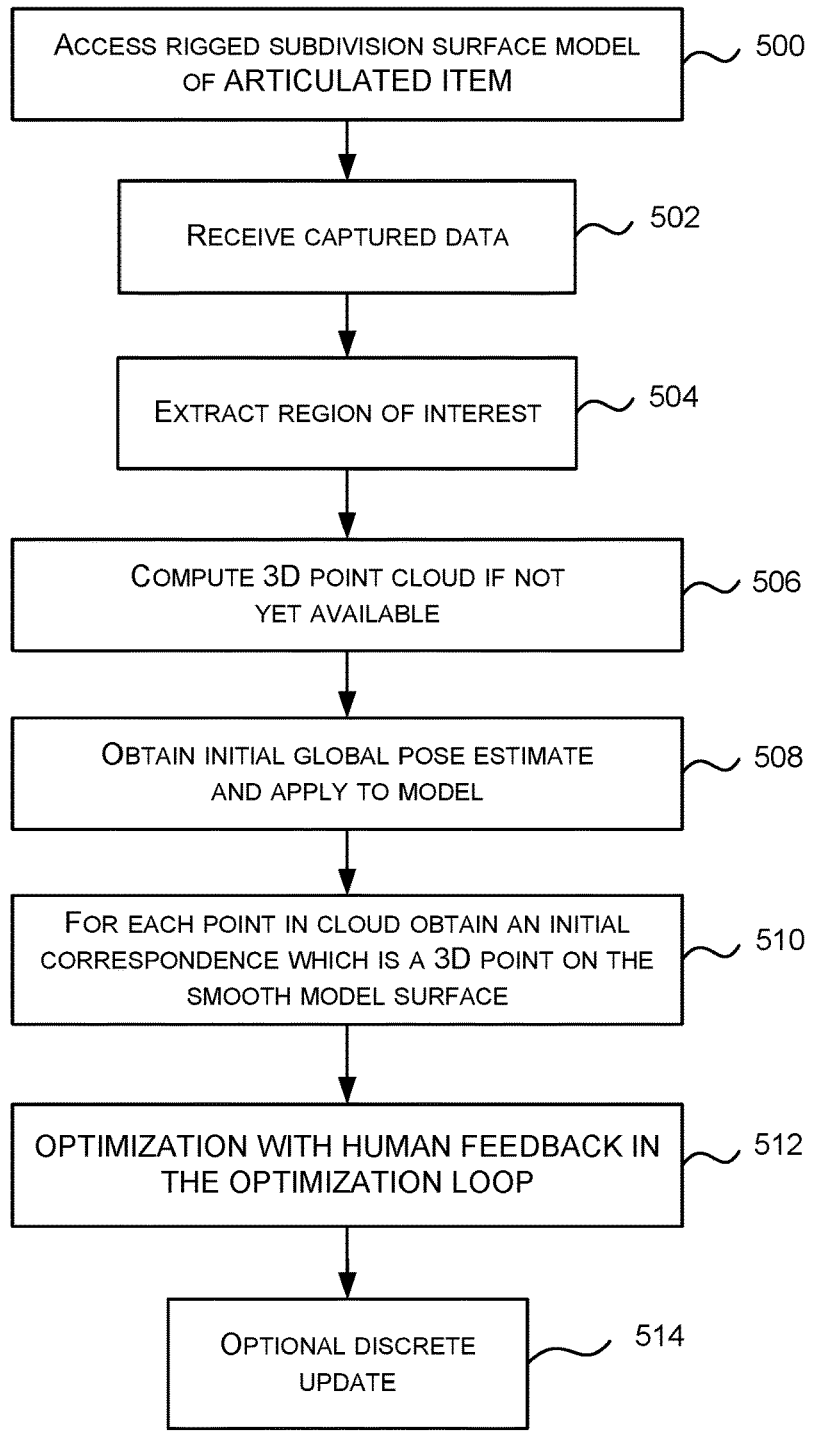
FIG. 5 is a flow diagram of a method of 3D model fitting.

FIG. 5 is a schematic diagram of a method of operation of a 3D model fitter which may be used together with the technology described herein. Note that this is one example of a 3D model fitter and many other types of 3D model fitter may be used, such as those which render an image from the 3D model and compare the rendered image with the observed images. In this example, the 3D model is a sub division surface model but other types of 3D model may be used.

The 3D model fitter accesses 500 a subdivision surface model of the articulated object. For example, in the case that the aim is to track a laptop computer the model fitter accesses 500 a subdivision surface model of a generic laptop.

The 3D model fitter receives captured data 502 depicting the object to be tracked. For example, the captured data 502 is a 3D point cloud, a depth map, a stereo image pair, one or more frames of raw time of flight data, color image data or other captured data depicting the object to be tracked. Optionally the 3D model fitter extracts 504 a region of interest from the captured data where the region of interest depicts the object to be tracked rather than other parts of the scene or environment in which the object is present. For example, the 3D model fitter uses machine learning technology or image analysis to extract a region of interest of the captured data depicting the object to be tracked. The region of interest may or may not be contiguous.

In some examples, where the region of interest comprises parts of a depth map, the 3D model fitter computes 506 a 3D point cloud by back projecting the region of interest. In some cases a 3D point cloud is already available. In some cases no 3D point cloud is used.

Optionally the 3D model fitter obtains 508 an initial pose estimate and applies it to the model. For example, by using a value of the pose computed for a previous instance of the captured data. For example, by recording a series of values of the parameters computed by the 3D model fitter and extrapolating the series to compute a predicted future value of the parameters. For example, by selecting a value of the parameters at random. For example, by selecting a value of the parameters using output of a machine learning algorithm.

Optionally the 3D model fitter obtains 510 initial correspondence estimates. A correspondence estimate is an indication of a 3D point on the surface of the subdivision surface model corresponding to a captured data point.

In some examples a correspondence is a tuple of values denoted by the symbol u in this document, which specifies a point on the smooth-surface model. The smooth surface itself is 2D and so point u acts in a similar way to a 2D coordinate on that surface. A defining function S is stored at the 3D model fitter in some examples and is a function which takes as its input a correspondence u and the pose parameters. The defining function S computes a 3D position in the world that point u on the smooth-surface model corresponds to.

The 3D model fitter obtains 510 a plurality of initial correspondence estimates, for example, one for each point in the point cloud, or one for each of a plurality of captured data points. The 3D model fitter obtains 510 the initial correspondence estimates by selecting them at random or by using machine learning, or by choosing a closest point on the model given the initial estimate of the global pose, using combinations of one or more of these approaches, or in other ways. In the case that machine learning is used a machine learning system has been trained using a large amount of training data to derive a direct transformation from image data to 3D model points.

The 3D model fitter computes an optimization 512 to fit the model to the captured data. The optimization is computed as described earlier in this document by introducing a human into the optimization loop.

In an example the 3D model fitter computes a minimization of the following objective function beginning from the initial values of the correspondence estimates and the parameters where these are available (or beginning from randomly selected values). Note that this is one objective function given for example and that it is not intended to limit the scope of the technology since many other objective functions may be used.

$$\min_{\theta_1,\ldots F, u_{11},\ldots u_{FN},\beta} \sum_{f=1}^{F} \sum_{i=1}^{N} \psi(\|x_{fi} - S(u_{fi}; \theta_f; \beta)\|)$$

Which is expressed in words as a minimum over the pose parameters θ and shape parameters β of each frame f of a total of F frames, and N values of the correspondences u in each frame of the sum of a robust kernel ψ(.) applied to the magnitude of the difference between a 3D point cloud point $x_{fi}$ and a corresponding 3D smooth model surface point of frame f, denoted S(u; $\theta_f$; β). Where the robust kernel) ψ(.) is a Geman-McClure kernel, a Huber kernel, a Quadratic kernel or other kernel.

Feedback data from the human in the optimization loop is aggregated with the objective function as described earlier in this document. In an example, a penalty function which is a quartic function clamped at zero during the accuracy range is used to describe the feedback from the human. The penalty function is aggregated with the above objective function by addition or in other ways. The penalty function is designed such that minimizing the modified objective function Ê will result in model parameters that agree with the human annotations, to the extent of the estimated accuracy of those annotations. In other words, any solution that disagrees with the annotations will be found to have a higher value of the energy Ê.

The optimization enables correspondence estimation and model fitting to be unified since the minimization searches over possible values of the correspondences u and over possible values of pose parameters θ. This is found to give better results than an alternative approach of using alternating stages of model fitting and correspondence estimation.

The optimization is non-linear in some examples. The result of the optimization is, for each frame, a set of values of the pose parameters θ including the global pose parameters and the joint positions, as well as a set of values of the shape parameters.

Because the model has a smooth surface it is possible to compute the optimization using a non-linear optimization process. For example, a gradient-based process which exploits the fact that rate of change of both surface position and surface orientation does not change substantially across edges in a smooth surface.

A discrete update operation is optionally used together with the optimization. This involves using the continuous optimization as mentioned above to update both the pose and the correspondences together, and then using a discrete update to re-set the values of the correspondences using the captured sensor data. The discrete update allows the correspondences to jump efficiently from one part of the object surface to another, for example, from one finger-tip to the next.

Figure 6:
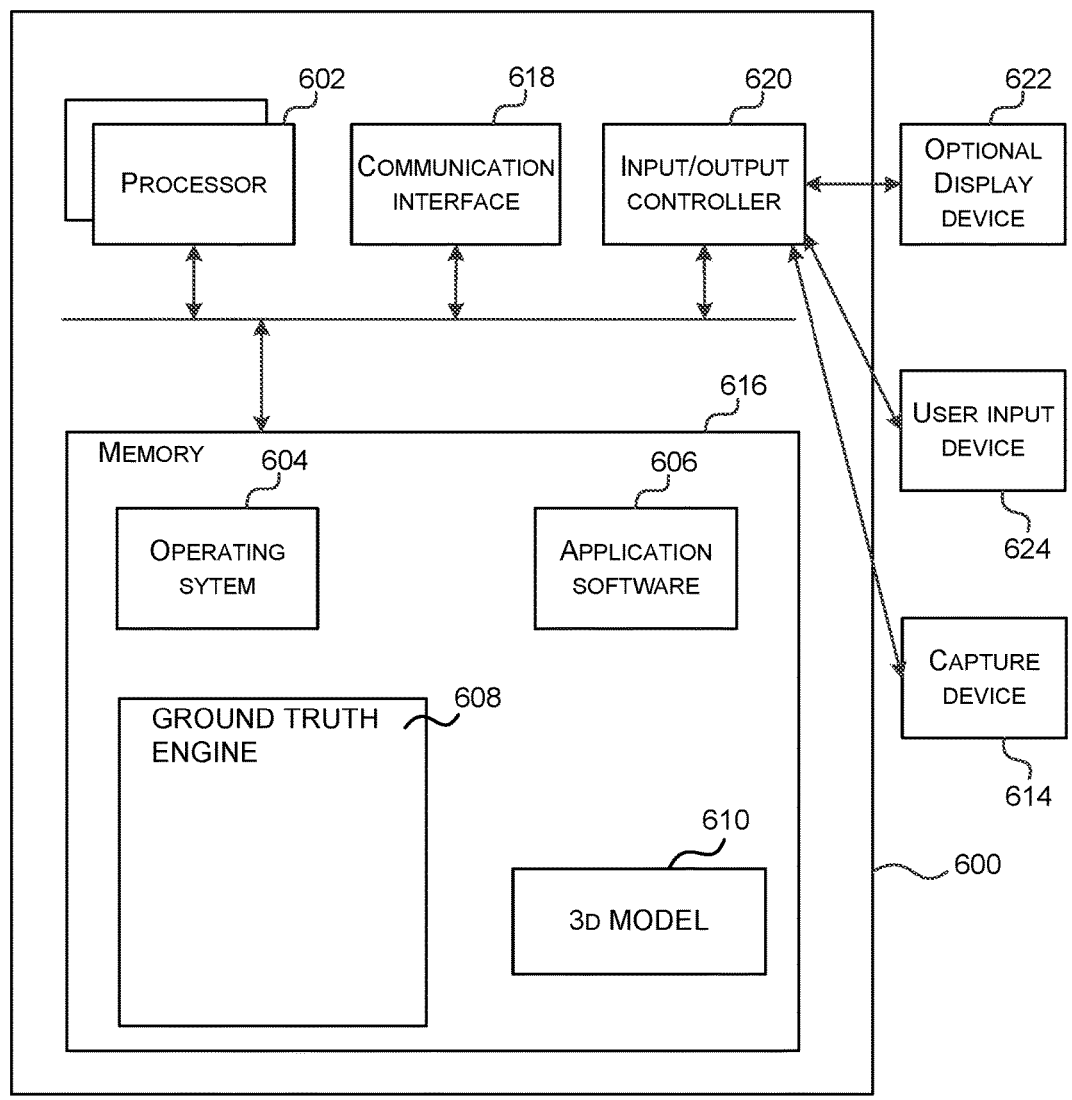
FIG. 6 illustrates an exemplary computing-based device in which embodiments of a ground-truth engine are implemented.

FIG. 6 illustrates various components of an exemplary computing-based device 600 which are implemented as any form of a computing and/or electronic device, and in which embodiments of a ground truth engine is implemented in some examples.

Computing-based device 600 comprises one or more processors 602 which are microprocessors, controllers or any other suitable type of processors for processing computer executable instructions to control the operation of the device in order to train a compressor and/or to use a trained compressor at test time. In some examples, for example where a system on a chip architecture is used, the processors 602 include one or more fixed function blocks (also referred to as accelerators) which implement a part of the method of FIGS. 2A, 2B, 4 and 5 in hardware (rather than software or firmware). Platform software comprising an operating system 604 or any other suitable platform software is provided at the computing-based device to enable application software to be executed on the device, such as a pose tracker. The computing-based device 600 comprises a ground truth engine 608 and a stored 3D model of an articulated item. The computing-based device 800 is optionally in communication with cloud computing resources such as via communication interface 618.

The computer executable instructions are provided using any computer-readable media that is accessible by computing based device 600. Computer-readable media includes, for example, computer storage media such as memory 616 and communications media. Computer storage media, such as memory 616, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 616) is shown within the computing-based device 600 it will be appreciated that the storage is, in some examples, distributed or located remotely and accessed via a network or other communication link (e.g. using communication interface 618). Memory 616 at the computing-based device holds objective functions, accuracy ranges, captured images, human verification results, human annotation results or other data.

The computing-based device 600 also comprises an input/output controller 620 arranged to output display information to a display device 622 which may be separate from or integral to the computing-based device 600. The display information may provide a graphical user interface. The input/output controller 620 is also arranged to receive and process input from one or more devices, such as a user input device 624 (e.g. a touch panel sensor, stylus, mouse, keyboard, camera, microphone or other sensor). In some examples the user input device 624 detects voice input, user gestures or other user actions and provides a natural user interface (NUI). This user input may be used in the human verification process, in the human annotation process, to view results and for other purposes. In an embodiment the display device 622 also acts as the user input device 624 if it is a touch sensitive display device. The input/output controller 620 outputs data to devices other than the display device in some examples, e.g. a locally connected printing device.

Any of the input/output controller 620, display device 622 and the user input device 624 may comprise natural user interface (NUI) technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A ground truth engine comprising:
  a memory holding a plurality of captured images depicting an articulated item;
  a processor configured to access a parameterized, three dimensional, 3D, model of the item;
  an optimizer configured to compute ground truth values of the parameters of the 3D model for individual ones of the captured images, such that the articulated item depicted in the captured image fits the 3D model, the optimizer configured to take into account feedback data from one or more humans, about accuracy of a plurality of the computed values of the parameters.

The ground truth engine described above wherein the optimizer is configured to repeat the computation of the values of the parameters until the parameters are verified as being ground truth values by another entity.

The ground truth engine described above wherein the optimizer is configured to trigger a process to obtain the feedback data with respect to selected ones of the captured images, and where the ground truth engine is configured to select the selected ones of the captured images using rules and/or human judgments.

The ground truth engine described above wherein the optimizer is configured to take into account the feedback data by aggregating at least one penalty function with an energy function which is optimized by the ground truth engine, the energy function expressing how the 3D model is expected to fit the captured images.

The ground truth engine described above wherein the optimizer is configured such that after use of the energy function with the aggregated penalty function, the optimizer re-runs using the energy function without the penalty function.

The ground truth engine described above wherein the penalty function comprises a feedback accuracy range within which the penalty function has no influence on the energy function.

The ground truth engine described above wherein the optimizer is configured to add a plurality of penalty functions to the energy function, and where different ones of the penalty functions have different feedback accuracy ranges.

The ground truth engine described above wherein the optimizer is configured to trigger a process to obtain the feedback data with respect to selected ones of the captured images, wherein the process comprises presentation of a 3D view of the 3D model having the computed values of the parameters applied to it.

The ground truth engine described above wherein the optimizer is configured to receive the feedback data in the form of annotations on a 3D view of the 3D model having the computed values of the parameters applied to it.

The ground truth engine described above wherein the optimizer is configured to receive the feedback data in form of annotations on a 3D view of the 3D model, the annotations comprising labels of one or more joints and/or parts of the articulated item.

The ground truth engine described above wherein the parameters of the 3d model comprise shape and pose parameters and wherein the ground truth values are computed for captured imaged depicting different instances of the articulated item.

The ground truth engine described above comprising:
a memory configured to store the ground truth values in association with the captured images; and
a processor configured to use the ground truth values and associated captured images to evaluate another process which computes pose of articulated entities from captured sensor data.

A computer-implemented method comprising:
accessing a plurality of captured images depicting an articulated item;
at a processor, accessing a parameterized, three dimensional, 3D, model of the item;
computing values of the parameters of the 3D model for individual ones of the captured images, by computing an optimization comprising an iterative process;
receiving feedback data from a human, about accuracy of a plurality of the computed values of the parameters and taking the feedback data into account during one or more iterations of the optimization.

The method described above comprising deciding when to stop receiving feedback data and when to stop the iterations of the optimization, in dependence on human verification of the computed values.

The method described above comprising triggering a process to obtain the feedback data with respect to selected ones of the captured images, in dependence on human verification of the computed values.

The method described above comprising to taking into account the feedback data by aggregating at least one penalty function with an energy function which is optimized by the ground truth engine.

The method described above wherein the penalty function comprises a feedback accuracy range within which the penalty function has no influence on the energy function.

The method described above comprising receiving the feedback data in the form of annotations on a 3D view of the 3D model having the computed values of the parameters applied to it.

The method described above wherein the captured images have been captured using a plurality of capture devices located a different positions around the articulated item.

A computer-implemented method comprising:
accessing a plurality of captured images depicting an articulated item;
at a processor, accessing a parameterized, three dimensional, 3D, model of the item;
computing values of the parameters of the 3D model for individual ones of the captured images, by computing an optimization;
receiving feedback data from a human, about accuracy of a plurality of the computed values of the parameters and taking the feedback data into account during one or more iterations of the optimization; and
using the computed values of the parameters as part of ground truth data to evaluate another process.

A computer-implemented apparatus comprising:
means for accessing a plurality of captured images depicting an articulated item;
means for accessing a parameterized, three dimensional, 3D, model of the item;
means for computing values of the parameters of the 3D model for individual ones of the captured images, by computing an optimization;
means for receiving feedback data from a human, about accuracy of a plurality of the computed values of the parameters and taking the feedback data into account during one or more iterations of the optimization; and
means for using the computed values of the parameters as part of ground truth data to evaluate another process.

For example, the means for accessing, means for computing, means for receiving feedback data, and means for using the computed values is the processor 112 when encoded to perform the operations illustrated in FIG. 2A or 2B.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A ground truth engine comprising:
a memory holding a plurality of captured images depicting an articulated item;
a processor configured to access a parameterized, three dimensional, 3D, model of the item;
an optimizer for fitting the captured images to the 3D model of the item, wherein the optimizer is configured to compute ground truth values of the parameters of the 3D model for individual ones of the captured images, such that the articulated item depicted in the captured image fits the 3D model, the optimizer configured to take into account feedback data from one or more humans, about accuracy of a plurality of the computed values of the parameters, and wherein the optimizer is configured to take into account the feedback data by aggregating at least one penalty function with an energy function which is optimized by the ground truth engine, the energy function expressing how the 3D model is expected to fit the captured images.

2. The ground truth engine of claim 1 wherein the optimizer is configured to repeat the computation of the values of the parameters until the parameters are verified as being ground truth values by another entity.

3. The ground truth engine of claim 1 wherein the optimizer is configured to trigger a process to obtain the feedback data with respect to selected ones of the captured images, and where the ground truth engine is configured to select the selected ones of the captured images using rules and/or human judgments.

4. The ground truth engine of claim 1 wherein the optimizer is configured such that after use of the energy function with the aggregated penalty function, the optimizer re-runs using the energy function without the penalty function.

5. The ground truth engine of claim 1 wherein the penalty function comprises a feedback accuracy range within which the penalty function has no influence on the energy function.

6. The ground truth engine of claim 5 wherein the optimizer is configured to add a plurality of penalty functions to the energy function, and where different ones of the penalty functions have different feedback accuracy ranges.

7. The ground truth engine of claim 1 wherein the optimizer is configured to trigger a process to obtain the feedback data with respect to selected ones of the captured images, wherein the process comprises presentation of a 3D view of the 3D model having the computed values of the parameters applied to it.

8. The ground truth engine of claim 7 wherein the optimizer is configured to receive the feedback data in the form of annotations on a 3D view of the 3D model having the computed values of the parameters applied to it.

9. The ground truth engine of claim 7 wherein the optimizer is configured to receive the feedback data in form of annotations on a 3D view of the 3D model, the annotations comprising labels of one or more joints and/or parts of the articulated item.

10. The ground truth engine of claim 1 wherein the parameters of the 3d model comprise shape and pose parameters and wherein the ground truth values are computed for captured imaged depicting different instances of the articulated item.

11. The ground truth engine of claim 1 comprising:
a memory configured to store the ground truth values in association with the captured images; and
a processor configured to use the ground truth values and associated captured images to evaluate another process which computes pose of articulated entities from captured sensor data.

12. The ground truth engine of claim 1 wherein results of the aggregation are presented to the human or a user.

13. A computer-implemented method comprising:
accessing a plurality of captured images depicting an articulated item;
at a processor, accessing a parameterized, three dimensional, 3D, model of the item;
computing values of the parameters of the 3D model for individual ones of the captured images, by computing an optimization for fitting the captured images to the 3D model of the item, wherein the optimization comprising an iterative process;
receiving feedback data from a human, about accuracy of a plurality of the computed values of the parameters and taking the feedback data into account during one or more iterations of the optimization, wherein the optimization is configured to take into account the feedback data by aggregating at least one penalty function with an energy function which is optimized by a ground truth engine, the energy function expressing how the 3D model is expected to fit the captured images.

14. The method of claim 13 comprising deciding when to stop receiving feedback data and when to stop the iterations of the optimization, in dependence on human verification of the computed values.

15. The method of claim 13 comprising triggering a process to obtain the feedback data with respect to selected ones of the captured images, in dependence on human verification of the computed values.

16. The method of claim 13 wherein the penalty function comprises a feedback accuracy range within which the penalty function has no influence on the energy function.

17. The method of claim 13 comprising receiving the feedback data in the form of annotations on a 3D view of the 3D model having the computed values of the parameters applied to it.

18. The method of claim 13 wherein the captured images have been captured using a plurality of capture devices located a different positions around the articulated item.

19. The method of claim 13 wherein results of the aggregation are output to a display device.

20. A computer-implemented method comprising:
- accessing a plurality of captured images depicting an articulated item;
- at a processor, accessing a parameterized, three dimensional, 3D, model of the item;
- computing values of the parameters of the 3D model for individual ones of the captured images, by computing an optimization for fitting the captured images to the 3D model of the item;
- receiving feedback data from a human, about accuracy of a plurality of the computed values of the parameters and taking the feedback data into account during one or more iterations of the optimization; and
- using the computed values of the parameters as part of ground truth data to evaluate another process, wherein the optimization is configured to take into account the feedback data by aggregating at least one penalty function with an energy function which is optimized by a ground truth engine, the energy function expressing how the 3D model is expected to fit the captured images.

* * * * *